US010464508B2

(12) United States Patent
Müller et al.

(10) Patent No.: US 10,464,508 B2
(45) Date of Patent: Nov. 5, 2019

(54) SWITCHING ARRANGEMENT FOR DISCHARGING AN ENERGY STORAGE DEVICE OF A MOTOR VEHICLE

(71) Applicant: MAN TRUCK & BUS AG, München (DE)

(72) Inventors: Anton Müller, Tutzing (DE); Dennis John, München (DE)

(73) Assignee: MAN Truck & Bus AG, Munich (DE)

( * ) Notice: Subject to any disclaimer, the term of this patent is extended or adjusted under 35 U.S.C. 154(b) by 602 days.

(21) Appl. No.: 15/159,475

(22) Filed: May 19, 2016

(65) Prior Publication Data
US 2017/0015261 A1    Jan. 19, 2017

(30) Foreign Application Priority Data

May 19, 2015   (DE) .................... 10 2015 006 416

(51) Int. Cl.
*B60R 16/03* (2006.01)
*B60L 3/00* (2019.01)
(Continued)

(52) U.S. Cl.
CPC ............ *B60R 16/03* (2013.01); *B60L 3/0046* (2013.01); *B60L 7/14* (2013.01); *H02J 7/0063* (2013.01); *H02J 7/1461* (2013.01); *B60L 2240/10* (2013.01); *B60L 2240/80* (2013.01); *H02J 7/345* (2013.01); *H02J 2007/0067* (2013.01)

(58) Field of Classification Search
None
See application file for complete search history.

(56) References Cited

U.S. PATENT DOCUMENTS 5,260,637 A * 11/1993 Pizzi ..................... B60L 11/005
320/103
2007/0024266 A1   2/2007 Yurgil
(Continued)

FOREIGN PATENT DOCUMENTS

DE    102012100951    8/2013
EP    0 533 037       3/1993
(Continued)

OTHER PUBLICATIONS

Search Report dated Oct. 26, 2016 which issued in the corresponding European Patent Application No. 16000858.7.

*Primary Examiner* — Thienvu V Tran
*Assistant Examiner* — David M Stables
(74) *Attorney, Agent, or Firm* — Cozen O'Connor

(57) ABSTRACT

A switching arrangement for discharging an energy storage device of a motor vehicle including an energy storage device that stores electrical energy and supplies an electrical machine of a motor vehicle, a discharging circuit having a discharging resistor, a voltage comparison element and an activation switching device. The activation switching device starts discharging the energy storage device via the discharging resistor at the end of a delay period after the motor vehicle has been switched off. The voltage comparison element compares the prevailing voltage of an energy storage voltage and a voltage threshold value and terminates the procedure of discharging the energy storage device if the prevailing voltage of the energy storage device is less than or equal to the voltage threshold value.

11 Claims, 1 Drawing Sheet

(51) Int. Cl.
  *B60L 7/14* (2006.01)
  *H02J 7/00* (2006.01)
  *H02J 7/14* (2006.01)
  H02J 7/34 (2006.01)

(56) References Cited

U.S. PATENT DOCUMENTS

| | | |
|---|---|---|
| 2007/0026711 A1 | 2/2007 | Chorian et al. |
| 2008/0290842 A1 | 11/2008 | Davis et al. |
| 2009/0268354 A1* | 10/2009 | Kaplan ................ B60L 3/0023 361/15 |
| 2010/0214055 A1 | 8/2010 | Fuji et al. |
| 2012/0062186 A1 | 3/2012 | Dessirier et al. |

FOREIGN PATENT DOCUMENTS

| | | |
|---|---|---|
| GB | 2510186 | 7/2014 |
| JP | 2011250494 | 12/2011 |
| WO | WO 2011/029702 | 3/2011 |
| WO | WO 2011/121235 | 10/2011 |

* cited by examiner

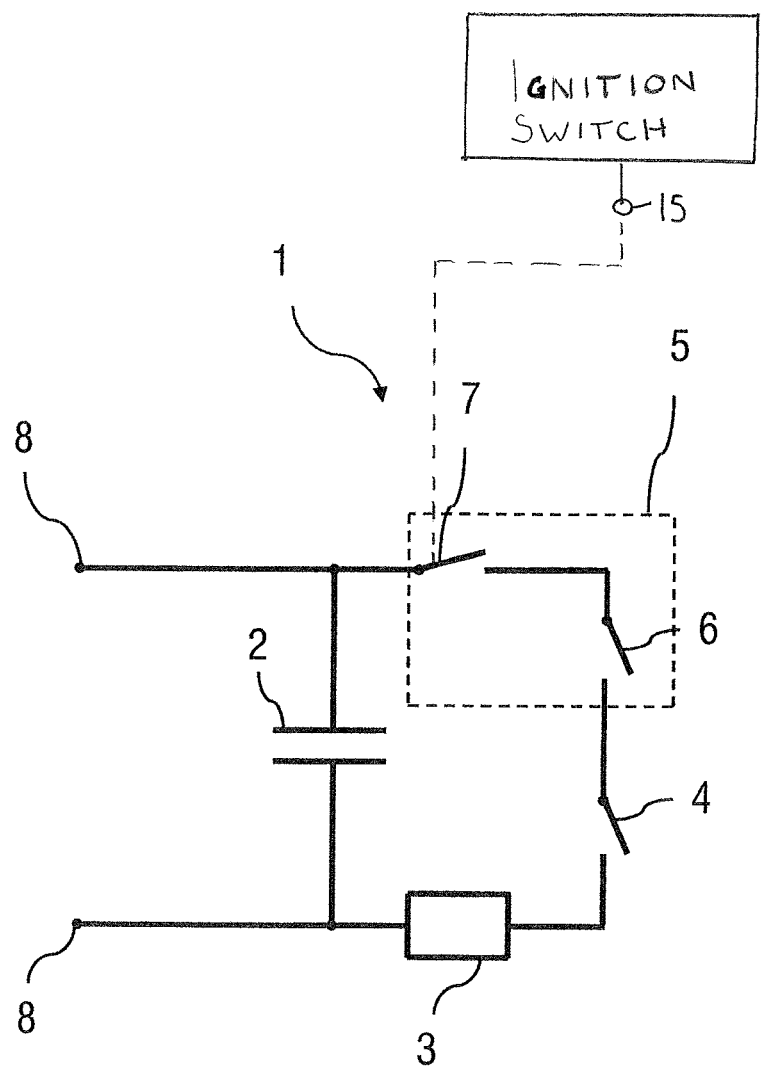

SWITCHING ARRANGEMENT FOR DISCHARGING AN ENERGY STORAGE DEVICE OF A MOTOR VEHICLE

BACKGROUND OF THE INVENTION

1. Field of the Invention

The invention relates to a switching arrangement for discharging an energy storage device of a motor vehicle, in particular for discharging an energy storage device that stores electrical energy and is provided so as to supply an electrical machine of a motor vehicle.

2. Description of the Related Art

Additional electrical energy storage devices are used in addition to or in lieu of a conventional 12V or 24V lead acid battery in mild hybrid, hybrid, and electric vehicles and these additional electrical energy storage devices are provided in the drive train to supply an electrical machine. An additional energy storage device of this type is frequently embodied as a lithium ion rechargeable battery or as a high capacity energy storage device. High capacity energy storage devices on the basis of double-layer capacitors are particularly favourable with respect to the capacity per mass. In this context, it is preferred that so-called ultra-capacitors are used, which are also referred to in short as ultracap or ultracap storage devices.

When using energy storage devices in the drive train with a high power capacity and low energy content, which for example ultra-capacitors are, these are normally charged up to nearly the maximum useful voltage prior to switching off the vehicle during the final braking procedure. Ultra-capacitors age most quickly in the high voltage state so that the serviceable life of the energy storage device can be adversely affected when storing energy storage devices of this type that have high charge voltages, in particular when the energy storage devices are fully charged.

On the other hand, it is not expedient from the energy point of view to automatically fully discharge the ultra-capacitor when switching off the motor vehicle or in a stop mode of a start-stop operation.

SUMMARY OF THE INVENTION

It is an object of one aspect of the invention to provide the opportunity to discharge an energy storage device that is provided in the drive train so as to supply an electrical machine and a further object is to be able to adjust the state of charge of the energy storage device in such a manner that it is avoided that the serviceable life of the energy storage device is greatly adversely affected when the vehicle is switched off for longer periods, and a further object is to reduce an amount of wasted energy of the energy content of the energy storage device. One aspect of the invention is a simple and cost-effective design of such a discharge opportunity.

The invention relates on the one hand to the technical knowledge that when the motor vehicle is switched off for longer periods the procedure of discharging the energy storage device to a medium voltage level offers a good comprise from the point of view of energy and from the point of view of aspects with regard to the serviceable life. It would be feasible at this point to discharge the energy storage device always to a middle voltage level if by virtue of the ignition switch—terminal 15—being opened it has been recognized that the vehicle has been switched off. However, it has been established within the scope of the invention that an opening of the ignition switch in response to the signal of the terminal 15 is not necessarily an indication that motor vehicles, in particular commercial vehicles, have been switched off for a longer period. On the contrary, it has been established that an "ignition switch OFF" signal from the terminal 15 in the case of vehicles, in particular commercial vehicles, often occurs 10 to 15 times daily so that it would be disadvantageous from the energy point of view if a discharging procedure were to be started immediately following the recognition of a terminal 15 signal that indicates the vehicle is switched off. It is advantageous after it has been recognized that the motor vehicle has been switched off to wait for a latent period prior to initiating a procedure of discharging the energy storage device to a middle voltage level.

In accordance with general aspects of the invention, a switching arrangement is provided for discharging an energy storage device of a motor vehicle. The switching arrangement comprises an energy storage device that stores electrical energy and is provided for supplying an electrical machine of a motor vehicle that is embodied preferably as a traction machine or as a crankshaft starter generator, and a discharging circuit. The discharging circuit is supplied with electrical energy by way of the energy storage device and comprises a discharging resistor, a voltage comparison, element and an activation switching device, preferably in the form of a series connection comprising the discharging resistor, the voltage comparison element and the activation switching device.

A procedure of discharging the energy storage device by way of the discharging resistor is started by the activation switching device at the end of a latent period (delay period) after the motor vehicle has been switched off. The activation switching device can be embodied to start the procedure of discharging the energy storage device by way of the discharging resistor at the end of the latent period (delay period) after the motor vehicle has been switched off. The activation switching device can be triggered externally, for example by a vehicle control unit, by way of example at the end of a latent period (delay period) after the motor vehicle has been switched off to start the procedure of discharging the energy storage device by way of the discharging resistor. The duration of the latent period can be fixed by way of example to a value that is in a range of 5 minutes to 1 hour, it is further preferred that it is in a range of 10 minutes to 30 minutes, or further preferred in a range of 10 minutes to 20 minutes.

Moreover, the voltage comparison element is embodied to compare the prevailing voltage of an energy storage device to a voltage threshold value and to terminate the procedure of discharging the energy storage device if, when comparing the voltages, it is established that the prevailing energy storage device voltage is less than or equal to the voltage threshold value.

The switching arrangement in accordance with one aspect of the invention thus renders it possible to discharge the energy storage device to a predetermined voltage threshold value that preferably corresponds to a middle voltage level of the energy storage device so that the energy storage device is not fully discharged. As a consequence, it is possible on the one hand to avoid energy-inefficient total discharges and on the other hand to avoid the serviceable life of the energy storage device being greatly adversely affected when the vehicle is switched off for longer periods. Moreover, a particular advantage of the invention resides in the fact that the partial discharging procedure does not occur immediately as the vehicle is switched off but rather is delayed, in other words not until a latent period has ended, so that it is possible to avoid energy-inefficient discharging procedures during procedures of switching off the motor vehicle, during which the driving operation is restarted after the vehicle has been switched off for a short period.

In order to render it possible to achieve a particularly cost-effective discharging circuit, it is advantageous in accordance with a further embodiment of the invention if the voltage comparison element is embodied as a passive voltage comparator circuit. The voltage comparator circuit is closed if the prevailing voltage of the energy storage device is greater than the voltage threshold value, and open if the prevailing voltage of the energy storage device is less than or equal to the voltage threshold value.

Moreover, it is advantageous if the voltage comparison element comprises a switching hysteresis in order to avoid an undefined "oscillation" of the switching operation about the voltage threshold value as a result of the recovery effects of the energy storage device.

In accordance with one exemplary embodiment of the invention, the activation switching device comprises a time switch that is closed at the end of a predetermined latent period after the vehicle has been switched off, preferably after the ignition switch has been switched off. It is only possible to discharge the energy storage device by way of the discharging resistor when the time switch is in the closed state. The latent period can be in the range merely by way of example of 10 to 30 minutes. Time switches of this type can be produced in a cost-effective manner and offer the advantage that it is easy to adjust the duration of the latent period for triggering the discharging procedure and also if required it is possible to preset said duration to different values in each case depending upon the vehicle type and/or the type of use for which the vehicle is intended.

In the case of an advantageous variant of this exemplary embodiment, the activation switching device comprises a switch arranged in series with respect to the time switch and is connected to the terminal 15 of the vehicle is such a manner that the switch is closed if the "ignition switch OFF" signal appears at the terminal 15. The switch is open if the "ignition switch OFF" does not appear, in other words when the ignition switch is switched on. Electrical energy is supplied to the ignition unit and the fuel supply circuit of the motor vehicle by way of the terminal 15. As the internal combustion engine is switched off, the ignition switch opens and the voltage at the terminal 15 drops to 0V which corresponds to the signal "ignition switch OFF". If this signal appears, then the consumer that is connected to the terminal 15 is switched off. A discharging procedure is thus only possible in accordance with this variant if both the switch that is connected to the terminal 15 of the vehicle and the time switch are closed.

In accordance with an alternative exemplary embodiment of the invention, the activation switching device can comprise a temperature switch that is closed if a temperature signal is below a predetermined temperature threshold value, wherein the temperature signal indicates a temperature curve of a component that cools down after the vehicle has been switched off. It is only possible to discharge the energy storage device by way of the discharging resistor when the temperature switch is in the closed state. The predetermined temperature threshold is preferably selected to be such that the duration of the period during which the component cools down from an operating temperature to the temperature threshold value after the vehicle has been switched off is in the range of the desired latent period for starting the discharging procedure. The component whose temperature is ascertained in order to determine a condition for triggering the discharging procedure can be the internal combustion engine. Alternatively, any other component that heats up during the driving operation to an operating temperature and cools down when the vehicle is in the switched off state can also be used for ascertaining a temperature threshold value that indicates that the vehicle has not been restarted for a period that is longer than a predetermined delay period.

In the case of an advantageous variant of this exemplary embodiment, the activation switching device comprises, in a similar manner to the exemplary embodiment that comprises the time switch, a switch that is arranged in series with respect to the temperature switch and is connected to the terminal 15 of the vehicle in such a manner that the switch is closed if the "ignition switch OFF" signal appears at the terminal 15.

A particularly preferred embodiment provides that the energy storage device is a capacitive energy storage device, preferably an ultracap storage device.

A further aspect of the invention relates to a vehicle, in particular a commercial vehicle, having a switching arrangement as is disclosed in this document.

The previously described embodiments and features of the invention can be combined in any desired manner with one another.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further details and advantages of the invention are described hereinunder with reference to the attached FIGURE that illustrates a schematic block diagram of a switching arrangement.

DETAILED DESCRIPTION OF THE PRESENTLY PREFERRED EMBODIMENTS

The switching arrangement comprises an ultra-capacitor (ultracap storage device) 2 that is connected by way of the connectors 8 to an electrical machine, e.g. in the form of a crankshaft starter generator (not illustrated) of a motor vehicle, or rather is connected to the vehicle electrical system, the partial vehicle electrical system or a high voltage network of the vehicle to supply the electrical machine with electrical energy when said machine is in the motor mode and to store any electrical energy that is generated when the electrical machine is operating in the generator mode.

Moreover, the switching arrangement comprises an autonomous discharging circuit 1 for the ultra-capacitor 2. The autonomous discharging circuit supplies itself with electrical energy from the ultra-capacitor 2. The discharging circuit 1 is embodied from a series connection of a discharging resistor 3, a voltage comparison element 4 and an activation switching device 5. The activation switching device 5 is embodied to start a procedure of discharging the energy storage device 2 by way of the discharging resistor 3 at the end of a latent phase after the motor vehicle has been switched off.

For this purpose, the activation switching device 5 is embodied as a series connection of a time switch 6 and a switch 7 that is connected to the terminal 15 of the vehicle. The switch 7 is closed if the "ignition switch OFF" signal appears at the terminal 15, in other words the switch 7 is closed as the ignition is switched off, which indicates that the vehicle has been switched off. The time switch 6 is still open at this point in time and is only closed at the end of a predetermined latent period after the vehicle has been switched off, preferably after an ignition switch has been switched off and consequently after the switch 7 has been closed. The duration of the latent period can have by way of example a value that is in the range of 10 to 30 minutes.

It has already been mentioned above that it is also possible to use a temperature switch, in lieu of the time switch 6, that is switched in response to a temperature signal that measures for example the temperature of the combustion engine. In accordance with this variant, the temperature switch is closed if the combustion engine has cooled down to a predetermined temperature level after it has been switched off.

The voltage comparison element 4 is embodied as a passive voltage comparator circuit 4 that is closed if the prevailing voltage of the energy storage device is greater than a predetermined voltage threshold value, and is open if the prevailing voltage of the energy storage device is less than or equal to the predetermined voltage threshold value. The predetermined voltage threshold value is fixed to a middle voltage level of the ultra-capacitor 2.

When the vehicle is not in the switched off state, in other words is in the normal driving operation, the switches 6 and 7 are open. If the driver switches the vehicle off, in other words the ignition switch is opened so that the voltage at the terminal 15 drops to zero or the "ignition switch OFF" signal appears at the terminal, the switch 7 is closed. The switch 6 is initially still open. The switch 6 is also closed at the end of the latent period. If the charge voltage of the ultra-capacitor 2 is greater than the predetermined voltage threshold value at this point in time, the ultra-capacitor 2 discharges by way of the discharging resistor 3. The discharging procedure is terminated in the event that the prevailing charge voltage of the ultra-capacitor 2 drops to the predetermined voltage threshold value since this causes the voltage comparator switch 4 to open.

Although the invention is described with reference to specific exemplary embodiments, it is clear to the person skilled in the art that it is possible to implement different modifications and equivalents can be used in lieu thereof without departing from the scope of the invention. In addition, many modifications can be performed without departing from the associated scope. Consequently, the invention is not limited to the disclosed exemplary embodiments but is also to include all exemplary embodiments that are covered by the scope of the attached claims. In particular, the invention also claims protection for the subject and the features of the subordinate claims independently from the claims to which reference has been made.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A switching arrangement for discharging an energy storage device of a motor vehicle that stores electrical energy and is provided to supply an electrical machine of the motor vehicle, comprising:
    a discharging resistor;
    a voltage comparison element configured to compare a prevailing voltage of the energy storage device against a voltage threshold value and to terminate discharging the energy storage device when the prevailing voltage of the energy storage device is less than or equal to the voltage threshold value, wherein the voltage comparison element is configured as a passive voltage comparator circuit that is closed if the prevailing voltage of the energy storage device is greater than the voltage threshold value, and is open if the prevailing voltage of the energy storage device is less than or equal to the voltage threshold value; and
    an activation switching device configured to one of:
        start a procedure to discharge the energy storage device by the discharging resistor at an end of a delay period that begins after the motor vehicle has been switched off or
        be triggered at the end of the delay period to start the procedure of discharging the energy storage device by way of the discharging resistor,
        wherein the voltage comparison element comprises a switching hysteresis.

2. The switching arrangement as claimed in claim 1, wherein the activation switching device comprises a time switch that is closed after a predetermined latent period after the motor vehicle has been switched off.

3. The switching arrangement as claimed in claim 2, wherein the activation switching device comprises a switch connected to a terminal of the motor vehicle such that the switch is closed if an "ignition switch OFF" signal appears at the terminal and arranged in series the time switch.

4. The switching arrangement as claimed in claim 1, wherein the activation switching device comprises a temperature switch that is closed if a temperature signal is below a predetermined temperature threshold value, wherein the temperature signal indicates a temperature curve of a component that cools down after the motor vehicle is switched off.

5. The switching arrangement as claimed in claim 4, wherein the activation switching device comprises a switch connected to a terminal of the motor vehicle such that the switch is closed if an "ignition switch OFF" signal appears at the terminal and is arranged in series with the temperature switch.

6. The switching arrangement as claimed in claim 4, wherein the component is an internal combustion engine.

7. The switching arrangement as claimed in claim 1, wherein the energy storage device is a capacitive energy storage device.

8. The switching arrangement as claimed in claim 7, wherein the capacitive energy storage device is an ultracap storage device.

9. The switching arrangement as claimed in claim 1, wherein the activation switching device comprises a time switch that is closed after an ignition switch has been switched off.

10. A vehicle, comprising:
- an energy storage device configured to store electrical energy provided to supply an electrical machine of the vehicle;
- a switching arrangement configured to discharge the energy storage device, comprising:
  - a discharging resistor;
  - a voltage comparison element configured to compare a prevailing voltage of an energy storage device against a voltage threshold value and to terminate discharging the energy storage device when the prevailing voltage of the energy storage device is less than or equal to the voltage threshold value, wherein the voltage comparison element is configured as a passive voltage comparator circuit that is closed if the prevailing voltage of the energy storage device is greater than the voltage threshold value, and is open if the prevailing voltage of the energy storage device is less than or equal to the voltage threshold value; and
  - an activation switching device configured to one of:
    - start a procedure to discharge the energy storage device by the discharging resistor at an end of a delay period that begins after the vehicle has been switched off or
    - be triggered at the end of the delay period to start the procedure of discharging the energy storage device by way of the discharging resistor, wherein the voltage comparison element comprises a switching hysteresis.

11. The vehicle as claimed in claim 10, wherein the vehicle is a commercial vehicle.

* * * * *